H. COMSTOCK.
MEANS FOR AUTOMATICALLY WEIGHING MATERIAL ON CONVEYER BELTS.
APPLICATION FILED JULY 27, 1911. RENEWED MAY 31, 1913.
1,067,972.
Patented July 22, 1913.
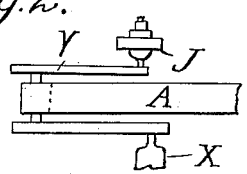
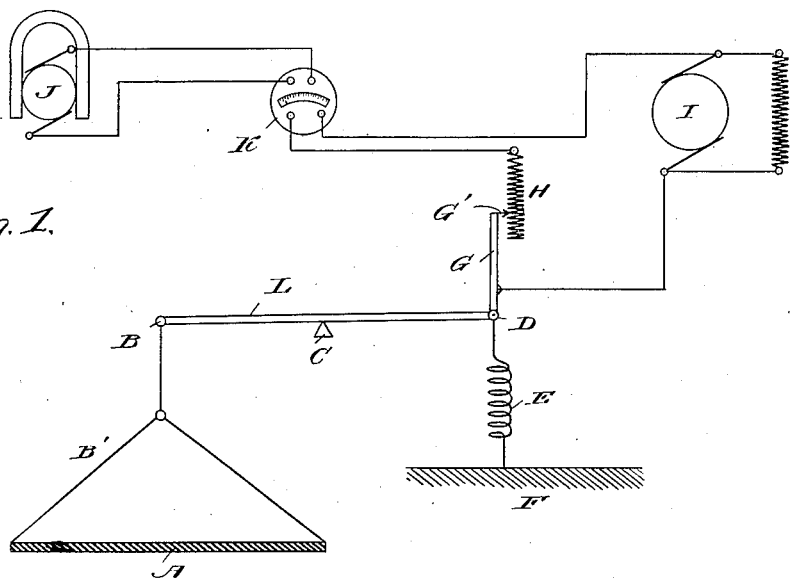

UNITED STATES PATENT OFFICE.

HARRY COMSTOCK, OF MINEVILLE, NEW YORK.

MEANS FOR AUTOMATICALLY WEIGHING MATERIAL ON CONVEYER-BELTS.

1,067,972.  Specification of Letters Patent.  Patented July 22, 1913.

Application filed July 27, 1911, Serial No. 640,920. Renewed May 31, 1913. Serial No. 771,112.

*To all whom it may concern:*

Be it known that I, HARRY COMSTOCK, a citizen of the United States, residing at Mineville, county of Essex, and State of New York, have invented certain new and useful Improvements in Means for Automatically Weighing Material on Conveyer-Belts, of which the following is a specification.

This invention relates to means for automatically weighing material on conveyer belts.

The amount of material passing over a conveyer belt in a given length of time is the product of the weight of the material and the speed of the belt. The present invention is based upon this fact and it has for its object the provision of novel electrical means for automatically indicating or recording the amount of material passing over a conveyer belt and so arranged that the instruments may be in the office at a point distant from the conveyer belt whose contents are being measured.

In the present invention, by the use of the novel electrical instrumentalities and circuit connections, I entirely obviate the employment of delicate weighing devices which have to be positioned at or near the belt itself, as has heretofore been the case, and provide measuring apparatus which is reliable almost to perfection, practically impossible to get out of order, and may be readily and inexpensively installed, as will more fully appear hereinafter.

In the accompanying drawings: Figure 1 illustrates the invention diagrammatically; and Fig. 2, is a detail plan showing an arrangement for driving the conveyer belt and generator by the same power.

A represents a cross-section of a conveyer belt. This may be supported on a platform such as used on platform scales, or, in the manner shown in the drawings, where L represents a lever fulcrumed at a point exactly intermediate its ends at C and having one end B connected by a suspending device B' to the conveyer belt so that the latter is suspended from the lever L while perfectly free to run in relation to the lever and said suspending device B'. A spring E which is secured to any suitable permanent member F, is connected at D to the other end of the lever L. It will be seen, therefore, that any change in the weight on the conveyer A will cause a corresponding compression or deflection of the spring E.

G represents an arm which is connected to or actuated by the lever L, and carries a contact G' adapted to play over the variable resistance H. The variable resistance H and the arm G may be a rheostat of any form whose temperature coefficient of the resistance material will be negligible.

I designates a direct current generator whose potential is maintained constant. Any means for supplying a direct current with a constant potential may be employed in this connection. One terminal of this source of direct current with constant potential is connected to the arm G, and the other terminal is connected to the current coil of a direct current wattmeter K. The other terminal of the current coil of the wattmeter K is connected to the variable resistance H. The terminals of the potential coil of the wattmeter K are connected to the terminals of a direct current generator J having permanent field magnets and driven by the same source of power X that drives the conveyer belt A as, for instance, by a belt Y running to the head or tail conveyer pulley so that the speed of this direct current generator J varies directly in proportion to the speed of the conveyer belt A and since the poles of the generator J are permanent magnets, the voltage of the generator J supplied to the potential coil of the wattmeter K, will vary directly with the speed of the conveyer belt. Other driving arrangements may be used for this purpose. The current through the current coil of the wattmeter K will vary directly with the amount of resistance H in the circuit of the generator I since the potential of the generator I remains constant. Furthermore, the amount of resistance included in the circuit of the generator I and current coil of the wattmeter K varies directly with the movement of the arm G, which, in turn, varies directly with the movement of the lever L, and consequently, with the movement of the conveyer belt A up or down according to the weight of the material which is passing thereover. The dial of the wattmeter K is graduated to read in pounds or tons and the torque of the meter is the product of the potential from generator J and the current from the generator I.

By the provision of electrical means related and operating as set forth, there remains no necessity for providing at the conveyer belt any delicate or complicated automatic weighing mechanism, and the wattmeter may be placed in the office or any other convenient place distant from the conveyer belt.

The invention is adapted for use in any connection where it is desired to indicate or record the amount of material passing over a conveyer belt, and, due to the lack of complicated parts and the utilization of electrical apparatus as aforesaid, the system will indicate or record the exact amount of material passing over the conveyer with as great accuracy as it is possible to obtain.

Alternating current is just as applicable as direct current in carrying out my invention, in which event, the resistance H would preferably be non-inductive, but if an inductive resistance is used, the alternating current meter which would be substituted for the wattmeter K would be calibrated for use with such inductive resistance. Any standard alternating current meter of the proper frequency and voltage may be used in place of the direct wattmeter K.

Having thus described my invention, what I claim as new and desire to secure by Letters Patent, is:—

1. In an electrical weighing apparatus, the combination with a conveyer belt, of an electrical generator driven at a speed varying substantially exactly in proportion to that of the conveyer belt and having a constantly excited field, a circuit, a source of current supply at constant potential for said circuit, means for automatically varying the resistance of said circuit in direct proportion to the rise and fall of the conveyer belt, and an electrical indicator in the circuit aforesaid and also in circuit with the electrical generator first-named.

2. In an electrical weighing apparatus, the combination with a conveyer belt, of an electrical generator driven at a speed varying substantially exactly in proportion to that of the conveyer belt and having a constantly excited field, a circuit, a source of current supply at constant potential for said circuit, a variable resistance included in said circuit, a lever moved in one direction or the other as the conveyer belt rises or falls under its load, a spring counteracting and balancing the conveyer belt, means operated by said lever for varying the resistance aforesaid in direct proportion to the rise and fall of the conveyer belt, and a wattmeter whose current coil is in the circuit aforesaid and whose potential coil is in the circuit of the electrical generator first-named.

In testimony whereof I hereunto affix my signature in presence of two witnesses.

H. COMSTOCK.

Witnesses:
JOHN L. SHEA,
SAMUEL SHAPIRA.